United States Patent

Haupt et al.

[15] 3,643,976
[45] Feb. 22, 1972

[54] LATCH FOR DRAFT ARM EXTENSION

[72] Inventors: Robert C. Haupt, Milwaukee; Donald E. Peterson, Wauwatosa, both of Wis.

[73] Assignee: Allis-Chalmers Manufacturing Company, Milwaukee, Wis.

[22] Filed: Oct. 19, 1970

[21] Appl. No.: 81,863

[52] U.S. Cl. ......................... 280/478 R, 172/272, 172/439, 280/460 A
[51] Int. Cl. ............................................................. B60d 1/00
[58] Field of Search ............... 280/478, 477, 460, 461, 456; 172/439, 272

[56] References Cited

UNITED STATES PATENTS

| | | | |
|---|---|---|---|
| 2,795,178 | 6/1957 | Silver et al. | 172/272 X |
| 3,334,692 | 8/1967 | Morkoski | 172/439 X |
| 3,437,355 | 4/1969 | Jeffes | 280/478 R |

*Primary Examiner*—Leo Friaglia
*Attorney*—Arthur L. Nelson, Kenneth C. McKivett and Robert B. Benson

[57] ABSTRACT

An extendible draft arm including an extendible member telescoping in a base member with a latch to retain the draft arm in its retracted position.

10 Claims, 6 Drawing Figures

PATENTED FEB 22 1972 3,643,976

Inventors
Robert C. Haupt
Donald E. Peterson
By
Attorney

LATCH FOR DRAFT ARM EXTENSION

This invention relates to a draft arm and more particularly to an extendible draft arm for a three-point hitch having a latch for retaining the draft arm in its retracted position.

Three-point hitches on a tractor include two lower draft arms and an upper link for connecting the tractor to the implement. The lower draft arms are connected to the implement and carry the draft load of the implement. Extendible draft arms generally consist of a pair of telescoping draft links with the inner member being connected to the implement while the outer member is connected to the tractor. The inner member is normally nonrotatable in the outer member with a locking pin extending through an opening in the outer member to engage a hook portion of the inner member when the extendible draft arm is fully retracted thereby locking the members together. The use of draft arm extensions on the lower draft arm is a convenience since the positioning of the tractor is not so critical because the draft arm extension can be moved longitudinally or transversely for a limited degree to accommodate coupling with the implement.

An example of a previously used latching element pivots about a pivot point spaced from the latching portion. The moving of the latching element through an arc required clearances which permitted excessive backlash or chucking resulting in peening of the surface areas between the element and the hook and the element and the outer member. Excessive peening or distortion of the parts resulted in the latching element becoming inoperative or difficult to release. This is partially due to the limited surface of the latch and the surface engaged by the latch which places excessive stress on the engaging parts which cause them to deform and fail to operate properly.

Accordingly this invention provides an improved latch which includes a rectangular latch block which forms the lower portion of the latch. The increased surface of the latch block contacts a larger area on the hook on the inner draft member and the wall of the outer draft member. The latch block is carried by a pin and is spring biased to the latched position and may be held in an unlatched position by selectively positioning a latch retainer which engages another pin on the handle of the latch mechanism. Unlatching permits ease in coupling of the tractor by merely raising the latch and positioning the retainer to hold the latch in the unlatched position. The latch retainer rotates about a vertical axis on the stem of the latch handle and selectively indexes on a wall to hold the latch in the disengaged position.

Accordingly it is an object of this invention to provide an extendible draft arm having a retainer to hold the latch in an unlatched position.

It is another object of this invention to provide a latch for an extendible draft arm having a latch block releasably locking the draft arm extension in a retracted position.

It is a further object of this invention to provide a latch normally biased to a latched position for use on an extendible draft arm and having a latch retainer for retaining the latch in the unlatched position.

The objects of the invention are accomplished by providing a latch on each of the lower draft arms of a three-point hitch. The draft arms are extendible draft arms and include a draft link adapted for connection to the tractor and a draft arm extension telescoping within a draft link. The latch includes a latch block resiliently biased to a latched position by means of a spring and positioned to engage a latching surface on a hook on the inner end of a draft arm extension. The latch engages the full transverse width of the hook on the inner end of the draft arm extension. A latch retainer is positioned on the latch mechanism which includes a sleeve rotatably receiving the stem of the latch handle. The stem on the latch handle carries a pin, extension, or welded protrusion extending radially from the latch handle adapted for reception within a vertical slot in a retainer sleeve. The retainer sleeve may have a handle or means to facilitate its rotation on the stem of the latch handle and the slot permitting the pin to slide vertically for latching of the latch mechanism. The latch can be disengaged and the retainer sleeve rotated in a manner to prevent the latch from engaging and permit extension of the draft arm extension for coupling with an implement. The draft arm extension is provided with lateral clearances on the intermediate portion between the draft arm extension and the inner width of the draft link in which the draft arm extension telescopes. Such clearance permits lateral movement of the draft arm extension as the extension is extended from the draft link to permit ease in coupling to the implement.

The preferred embodiment of this invention is illustrated in the attached drawings.

Figure 1:
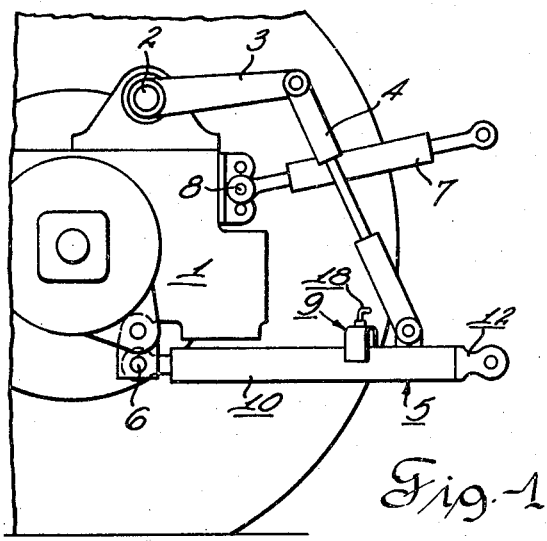
FIG. 1 illustrates the latch position of the lower draft arms of the three-point hitch.

Referring to FIG. 1 a tractor 1 is shown with a rock shaft 2 carrying the crankarms 3. The crankarms 3 are connected to lift links 4. The lift links 4 lift the draft arms 5 which are pivotally connected on a shaft 6. An upper link 7 is pivotally connected on a shaft 8 supported on the tractor 1. The latch 9 is supported on the draft arm 5.

Figure 2:
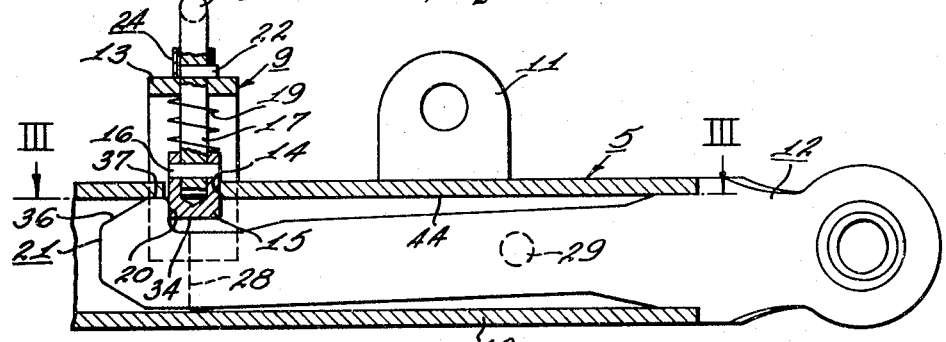
FIG. 2 is a cross section view taken vertically through draft arm and the latch.

FIG. 2 shows a draft arm 5 and the latch 9 in section. The draft arm 5 includes a hollow draft link 10 carrying a bracket 11 adapted for connection to the lift link 4. The draft arm extension 12 is shown retracted in the draft link 10. The latch 9 includes a housing 13 welded to the lateral and top surfaces of the draft link 10. An opening 14 receives the latch block 15. The latch block 15 is connected by a connecting pin 16 to the stem 17 of the latch handle 18. The spring 19 biases the latch block 15 downwardly to an engaging position with the surface 20 of the hook 21.

The handle 18 also carries a retainer pin 22 which extends radially from the stem 17 and is received within a slot 26 in the retainer sleeve 24. FIG. 2 shows the latch in a latched position.

Figure 4:
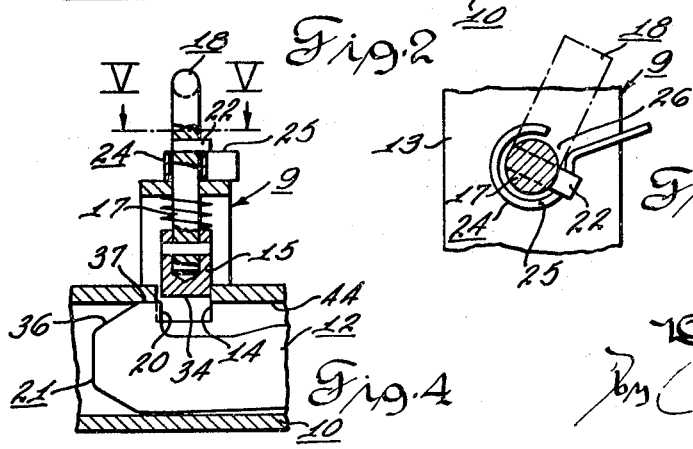
FIG. 4 is an enlarged cross section view of the latch and the draft arm with the draft extension in the retracted position.
Figure 5:
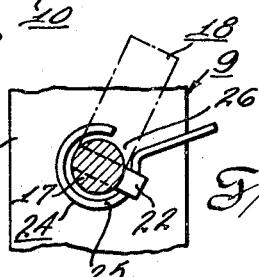
FIG. 5 is a cross section taken on line V—V of FIG. 4.

FIG. 4 and FIG. 5 show the same latch in the unlatched position whereby the hook 21 of the draft arm extension 12 is free to move to an extended position in a right-hand direction. The latch 9 is shown with the retainer pin 22 riding on the upper surface 25 of the retainer sleeve 24. The retainer sleeve 24 is rotated to a position as shown in FIG. 5. The retainer sleeve 24 retains the latch block in a raised position clearing the hook 21 and permitting extension of the draft arm extension 12 so long as the retainer pin 22 rides on the upper surface 25. When the retainer 24 is rotated to a position whereby the retainer pin 22 slides into the slot 26 the latch block 15 is free to move downwardly within the opening 14 to the latched position.

Figure 3:
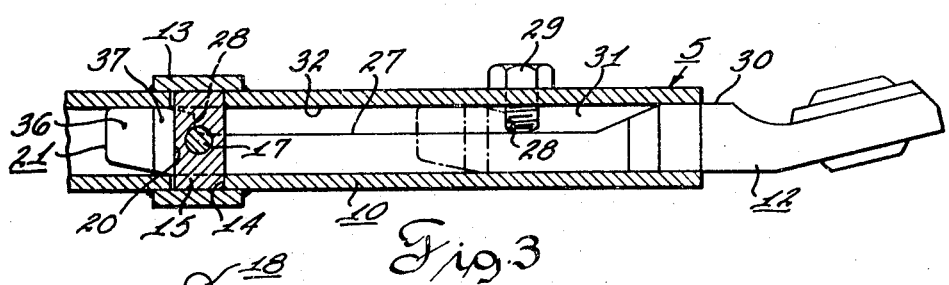
FIG. 3 is a cross section view taken on line III—III OF FIG. 2.

FIG. 3 illustrates a cross section view with the draft arm extension 12 in the latched position within the draft link 10. The draft link 10 is shown with a latch block 15 engaging the hook 21. The housing 13 is fastened to the lateral and top surfaces of the draft link 10. A view of the draft arm extension 12 is shown forming a locking surface 28. The locking surface 28 is shown engaging a bolt 29 which defines the limit of the extension for the draft arm extension 12 from the draft link 10.

The draft arm extension 12 is provided with a recessed lateral portion defined by the surface 27 which permits the draft arm extension 12 to move transversely when the alignment surface 30 is extended beyond the end of the draft link 10. The provision of a clearance 31 between the lateral surface 27 of the draft arm extension 12 and the inner surface 32 of the draft link 10 provides for transverse movement of the draft arm extension 12 to facilitate coupling to the implement. The draft arm extension may be extended to any desired length between the two positions shown in FIG. 3 which also facilitates coupling to an implement.

Figure 6:
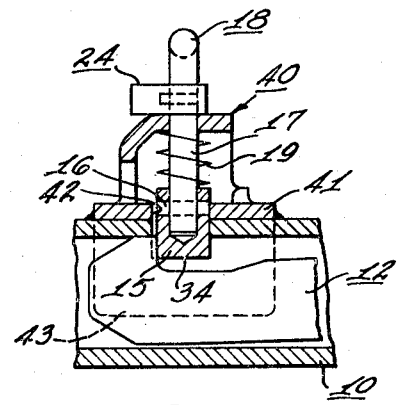
FIG. 6 is a cross section view of a modification of the latch.

FIG. 6 illustrates a modification of the latch. The casting 40 supports the latch handle 18 and forms a base 41 extending across the upper surface of the link 10. The base 41 forms an opening 42 receiving the latch block 15 providing a greater bearing surface for latching forces. The base 41 and flanges 43 are welded to the draft link 10.

The latch mechanism as shown and described operates in the following manner:

A latch handle 18 has an upper portion extending transversely relative to the stem 17. When the handle is lifted the latch block 15 is also lifted and the latch block is unlatched from the hook 21 in the draft arm extension. If it is desired that the latch be held in the unlatched position the retainer sleeve 24 on the stem 17 of the latch handle 18 is rotated. This provides a means for holding a latch block above the inner surface 32 of the upper wall of the draft link 10. The draft arm extension in the draft link can be freely extended to the phantom position as shown in FIG. 3. In this position the locking surface 28 engages the bolt 29 which forms a stop. With the draft arm extension extended to the desired position the implement can more readily be coupled to the draft arm extension 12. Latching of the draft arm extension is permitted by rotating the retainer sleeve 24 to a position where the retainer pin 22 drops within the slot 26. In this position the latch block 15 drops down in the opening 14 of link 10 and is in a position to latch on the hook 21.

When the latch block 15 is retracted the lower surface 34 of block 15 is above the inner surface 32 of the draft link 10. When the latch block 15 is released it is biased to a position below surface 44 of draft link 10 by spring 19. The draft arm extension 12 is retracted by physically shortening the draft arm 5. This may be accomplished by backing up the tractor and causing the extension 12 to telescope within the draft link 10. When the hook 21 moves inwardly within the draft link 10 the ramp 36 engages the lower surface 34 of the latch block 15 causing the latch block 15 to ride up over the surface 37 on the hook 21. This permits the draft arm extension 12 to continue in a left-hand direction until it drops over the hook and engages the surface 20 of the hook at which time the draft arm extension 12 is latched in a retracted position within the draft link 10.

The preferred embodiments of this invention have been illustrated and described.

The embodiments of the invention in which an exclusive property or privilege is claimed are defined as follows:

1. A latch for use in an extendible draft arm of a tractor three-point hitch comprising, a lower draft arm including a draft link adapted for connection to a tractor, a draft arm extension telescoping within said draft link, hook means on the inner end of said draft arm extension defining a latch engaging surface normal to the axis of said extension, a latch on said draft link for moving normally to the axis of said link and latching said extension in a contracted position in said draft link including, a latch housing connected to said draft link, a latch block slidably moving in said draft link, a latch handle extending through said latch housing connected to said latch block, means resiliently biasing said latch block to a latched position engaging the hook of said draft arm extension, a retainer on said housing for selective positioning to retain said latch in an unlatched position.

2. A latch for use in an extendible draft arm of a tractor three-point hitch as set forth in claim 1 including a retainer pin, on said latch handle means, a retainer sleeve in said retainer engaging said retainer pin to maintain said latch in an unlatched position.

3. A latch for use in an extendible draft arm of a tractor three-point hitch as set forth in claim 1 wherein said retainer includes a sleeve defining an axial slot positioned for rotatably moving around said latch handle, a sleeve handle on said retainer sleeve for rotating said sleeve around said latch handle, protruding means on said latch handle for reception in said slot to permit said latch to engage when said means is received in said slot of said retainer sleeve.

4. A latch for use in an extendible draft arm of a tractor three-point hitch as set forth in claim 1 wherein said latch includes a stem on said latch handle, a pin positioned in said stem and extending radially therefrom, a sleeve embracing said stem and defining an axial slot adapted for reception of said pin to permit said latch to move into the latch position.

5. A latch for use in an extendible draft arm of a tractor three-point hitch as set forth in claim 1 wherein said draft link defines a central opening, said hook on said draft arm extension defines a transverse latch engaging surface for engaging said latch block the full width of said opening, means defining a lateral surface on said latch block extending the full width of said opening in said draft link to thereby provide engaging surfaces of said latch block and said hook throughout the width of the central opening of said draft link.

6. A latch for use in an extendible draft arm of a tractor three-point hitch as set forth in claim 1 wherein said draft arm extension defines a locking surface on the side of said draft arm extension, a recessed portion on the side of said draft arm extension extending for a substantial portion on the side of said draft arm extension, a stop element positioned on the side of said draft link and extending into said recessed portion of said draft arm extension, said hook means and latch thereby defining the retracted position of said draft arm extension and said stop element engaging said locking surface of said draft arm extension defining the extended position of said draft arm extension.

7. A latch for use in a draft arm of an extendible tractor three-point hitch as set forth in claim 1 wherein said draft link defines an opening extending on the downwardly through the upper wall of said draft link for the reception of said latch block, an inner surface defined by the upper wall of said draft link, said retainer defining a sleeve of greater vertical dimension than the hook engaging portion of said latch block to thereby retain the latch block above the lower inner surface of the upper wall of said draft link when said latch is retracted.

8. A latch for use in an extendible draft arm of a tractor three-point hitch as set forth in claim 1 wherein said draft link defines a vertical opening forming vertical surface on said draft link, said hook of said draft arm extension defines a parallel surface with the surfaces of said opening, said latch block defines parallel surfaces on the surfaces engaging said hole of said draft link and the hook of said draft arm extension to thereby reduce rotational torque created on said latch block.

9. A latch for use in a draft arm of an extendible tractor three-point hitch as set forth in claim 1 wherein said hook means on said draft arm extension defines a ramp adapted for engaging said latch block to permit said hook to ride under said latch block when said draft arm extension is contracted within said draft link.

10. A latch for use in an extendible draft arm of a tractor three-point hitch as set forth in claim 1 wherein said draft arm extension defines an intermediate recessed lateral portion to permit lateral movement of the draft arm extension when the extension is extended from the draft link to facilitate coupling to an implement.

* * * * *